(12) United States Patent
Magni et al.

(10) Patent No.: US 11,261,035 B2
(45) Date of Patent: Mar. 1, 2022

(54) COMPONENT FOR FEEDING ROBOTS, AUTOMATION SYSTEMS AND THE LIKE

(71) Applicant: TERA AUTOMATION S.R.L., Poppi (IT)

(72) Inventors: Serena Magni, Castel San Niccolo' (IT); Luca Checcacci, Pratovecchio Stia (IT); Tiziano Checcacci, Pratovecchio Stia (IT); Luca Fiorini, Bibbiena (IT); Flavio Pancini, Poppi (IT); Federico Rossi, Arezzo (IT)

(73) Assignee: TERA AUTOMATION S.R.L., Poppi (IT)

(*) Notice: Subject to any disclaimer, the term of this patent is extended or adjusted under 35 U.S.C. 154(b) by 247 days.

(21) Appl. No.: 16/591,028

(22) Filed: Oct. 2, 2019

(65) Prior Publication Data

US 2020/0101593 A1 Apr. 2, 2020

(30) Foreign Application Priority Data

Oct. 2, 2018 (IT) ........................ 102018000009113

(51) Int. Cl.
| | |
|---|---|
| B65G 47/56 | (2006.01) |
| B65G 47/244 | (2006.01) |
| B65G 47/24 | (2006.01) |
| B65G 47/22 | (2006.01) |
| B25J 9/00 | (2006.01) |
| B65G 47/68 | (2006.01) |
| B23P 19/00 | (2006.01) |

(Continued)

(52) U.S. Cl.
CPC ............ *B65G 47/56* (2013.01); *B23P 19/001* (2013.01); *B25J 9/0093* (2013.01); *B65G 47/14* (2013.01); *B65G 47/1492* (2013.01); *B65G 47/22* (2013.01); *B65G 47/24* (2013.01); *B65G 47/2445* (2013.01); *B65G 47/57* (2013.01); *B65G 47/68* (2013.01); *B65G 2207/14* (2013.01); *B65G 2811/0621* (2013.01); *B65G 2812/02128* (2013.01)

(58) Field of Classification Search
CPC .... B65G 47/2445; B65G 47/22; B65G 47/24; B65G 47/56
See application file for complete search history.

(56) References Cited

U.S. PATENT DOCUMENTS 4,356,908 A * 11/1982 Embro, Jr. .............. B07C 5/362
198/454
6,026,947 A * 2/2000 Persson .................. A22C 25/12
198/364

(Continued)

FOREIGN PATENT DOCUMENTS

| EP | 2607064 B1 | 6/2013 |
|---|---|---|
| EP | 2835214 A1 | 2/2015 |

(Continued)

*Primary Examiner* — Thomas Randazzo
(74) *Attorney, Agent, or Firm* — Pearne & Gordon LLP

(57) ABSTRACT

Described is a component (1) for powering robots, automation systems and the like which comprises, on a frame (2), a series of belts (3, 4) for conveying objects (9) designed to be gripped by a robot. The conveyor belts (3, 4) constitute a closed path and have a first belt (3) and at least a second belt (4) positioned in such a way that the objects (9) pass from the first belt (3) to the second belt (4) cyclically and continuously.

9 Claims, 3 Drawing Sheets

(51) Int. Cl.
*B65G 47/14* (2006.01)
*B65G 47/57* (2006.01)

(56) References Cited

U.S. PATENT DOCUMENTS

| | | | |
|---|---|---|---|
| 7,007,792 B1 * | 3/2006 | Burch | B65G 17/24 198/370.03 |
| 7,028,830 B2 * | 4/2006 | Beesley | B65G 47/5131 198/594 |
| 7,222,723 B2 * | 5/2007 | Horton | B65G 47/5131 198/594 |
| 2002/0125107 A1 * | 9/2002 | Horton | B65G 47/5131 198/594 |
| 2015/0014123 A1 | 1/2015 | Matsuda et al. | |
| 2018/0273295 A1 | 9/2018 | Wagner et al. | |

FOREIGN PATENT DOCUMENTS

| | | |
|---|---|---|
| FR | 2595670 A1 | 9/1987 |
| GB | 2018705 A | 10/1979 |

* cited by examiner

COMPONENT FOR FEEDING ROBOTS, AUTOMATION SYSTEMS AND THE LIKE

This invention relates to a component for powering robots, automation systems and the like.

The invention described herein is aimed at the field of industrial automation, in particular automatic robotized systems.

The request for flexible robotized systems which are able to satisfy a wide range of requirements is constantly increasing in this industrial field.

A problem of these systems is due to the fact that, when the pieces to be fed comprise at least one cylindrical part or tend to superpose, even if in a planimetric fashion, they are prone to rolling, thereby more often than not providing parts to the robot which cannot be easily gripped.

With this type of feeder, whether by linear and/or vibrational feeding, it is not possible to vary, in any case, the position and the arrangement of the pieces on the plane, thus slowing down the production chain with significant costs for the final production.

For this purpose, feeder devices feed the pieces which are to be picked up by the robots through a mechanical shaking action and/or linear movement obtained by means of motor-driven belts.

There are numerous industrial fields in which robot feeders are used, ranging from the sectors of rubber, plastic and other synthetic materials to that of glass, from the food industry to the cosmetic, pharmaceutical and medical industry, from car components to the electrical household appliances, from computers and electronic equipment, to metal parts, and also the wood industry and accessories for furniture or mechanical processing.

For this reason, the feeders for automatic lines can differ considerably from each other, according to their technical characteristics and on the basis of their use; or rather, according to the purpose performed during the design. According to the prior art, feeder devices are known which comprise a rotary and vibrating plate, if necessary with strikers used to move the parts to be separated from each other.

These feeders are very expensive and have the problem that, during operation of the vibrating means, the components to be picked up reach the peripheral portions of the plate and therefore tend to overlap without providing clear pick-up points for the robot.

The vibrating labyrinth orienting devices are very efficient and of limited cost.

These devices, however, have the limitation of being shaped only for a predetermined product and they therefore lack flexibility.

A valid alternative to these feeders, which is inexpensive and flexible, is that with vibrating channels. They use the vibration principle for singularising, aligning and disentangling the elements.

However, these devices are not able to overturn large pieces and cannot be equipped with backlighting means.

Moreover, this type of feeder unit, even if it has artificial vision means, such as, for example, linear, matrix, three-dimensional and similar video cameras, is not able to provide a reliable recognition of the objects and therefore a good gripping precision by the robot.

Moreover, in devices of this type the objects arrive at the robot arranged in a non-organic manner on the belt or on the gripping surface, making the gripping work of the robot more difficult.

The aim of the invention is to overcome the above-mentioned drawbacks in known types of components for feeding robots, automation systems and the like which, although inexpensive and compact, do not have difficulties in overturning even large pieces.

In the context of the above-mentioned purpose, an aim of the invention is to provide a component for feeding robots, automation systems and the like, to which parts can be fed in a flexible fashion and which can therefore be used for objects of various shapes and sizes, even very different from each other.

Another aim of the invention is to allow the robot to work in a more effective manner.

Yet another aim of the invention is to provide a component for feeding robots, automation systems and the like, with means which are easily available on the market and using materials of common use, in such a way that the device is economically competitive.

This purpose, as well as these and other aims which will become clearer below, are achieved by a component for feeding robots, automation systems and the like, according to the invention, comprising on a frame:

a set of belts for conveying objects designed to be picked up by a robot;

said conveyor belts constituting a closed path; and having a first belt and at least a second belt positioned in such a way that the objects pass from the first belt to said at least one second belt in a cyclical and continuous manner.

Advantageously, the component has a structure such as to be a module of an automatic island, designed to be inserted downstream of different systems for feeding objects, such as, for example, hoppers, belts, vibrators, etc.

Moreover, it may also operate autonomously and be fed manually each time.

The modular structure makes it possible to control the format changes in an easier manner, affecting only some modules and not the entire assembly, in such a way as to make the feeder more flexible to the quantities of objects to be stored and to the method for loading the belts.

Advantageously, the first and the second belt are positioned in such a way that their respective directions of extension are substantially parallel to each other, in such a way as to limit the overall dimensions, thus forming an extremely compact component.

Advantageously, at least one of the two conveyor belts can be oriented by adjustment means along an operating direction. The operating direction is substantially normal relative to the direction of extension of the adjustable belt, between a first and a second position. In the first position, the direction of extension of the adjustable belt is substantially parallel to the ground whilst in the second position it is inclined and defines a predetermined angle with the ground.

The Applicant has, in fact, understood that inclining one of the two transmission belts, initially both substantially parallel to the ground, produces a counter-slope which, creating a difference in level between two end portions of the two belts, a sort of step, allows the overturning of any object which passes from one belt to another, even the largest ones.

In this way, it is possible to adjust the inclination of the belt which can be oriented according to the size and shape of the piece or also choose to keep it substantially parallel relative to the ground.

Advantageously, there are means for separating objects positioned on the conveyor belt, into at least two separate parts of the belt, in such a way as to untangle, separate and therefore align the objects directed to the robot. The separating means preferably comprise at least one series of pistons which can be operated individually or collectively and which produce an offsetting of the supporting surface of the objects which, therefore, tend to be separated, positioning on opposite sides of the belt relative to the direction of striking of the piston.

Each piston, in effect, moved individually or collectively, is designed to alternately press the lower surface (that is, the one facing the ground) of the belt moving, rhythmically from the bottom upwards and from the top downwards striking the belt, in such a way as to select and control the direction and intensity of the vibrating action.

Advantageously, there are means for aligning the objects positioned on at least one conveyor belt, which are designed to guide the objects during the continuous cycle path.

In the same way, diverting means are advantageously provided to favour the passage of the objects from one belt to another.

Moreover, another advantage which is achieved by aligning the objects is due to the fact that in this way the probability of failure of the vision system of the robot is reduced, since the objects always fall within the work area of the vision system.

Preferably, these aligning means comprise traps formed on the supporting surface (above the ground) of the conveyor belts which act as cross-section reducers in such a way as to align the objects to be picked up in the middle portion of the belt.

The diverting means comprise diverters, positioned approximately at the end of stroke of the conveyor belt and positioned in such a way that the diverters of the first belt are substantially located at the diverters of the second belt, in such a way as to allow the resting of the objects and their sliding from one belt to the other.

Preferably, in order to facilitate the passage of the objects from one belt to another, in the proximity of the step which is created by inclining one of the two belts, a chute is provided.

For this reason, two chutes are preferably mounted, substantially close to the end stops of the two belts, at the difference in level which would be created by orienting the second belt by the predetermined angle and, obviously, close to the diverting means. The Applicant has noted that in order to improve the precision in the identification of objects by the robot, which normally uses vision systems of per se known type, such as a video camera or a camera interconnected with a data processor, it is possible to favour the chromatic contrast between the object to be picked up and the background, in such a way as to better define, that is, more markedly, the edges of the object.

For this purpose, advantageously, use is made of means for backlighting the object to be picked up relative to at least one portion of the action of the conveyor belts, that is to say, an area of the belt designed to be the zone of action of the robot.

Preferably, the backlighting means comprise a backlighting device located below the portion of action of the belt and a filtering means. The filtering means made of optically transparent material and integral with the frame are interposed between the portion of action of the belt and the backlighting device, in such a way that the light coming from the backlighting device and filtered by the filtering means provides a chromatic contrast with the vision systems of the robot and the mechanical support for the picking up, or in any case with similar means.

As well as providing the chromatic contrast with the object to be picked up, the filtering means advantageously give solidity to the pick-up surface of the robot.

Advantageously, part of the invention is also a system for zero-setting the object designed to be gripped by the robot. The zero-setting system allows a decisive and secure gripping of the parts by the robot, using gripping means, consisting of two pistons acting on a template, integral with the frame and suitably shaped to copy the object to be picked up in a negative form.

Preferably, the pistons are positioned on a head: a positioning piston presses the object on the template, which—as mentioned above—has a shape which is the negative copy of the object, and a movement piston moves the positioning piston by translating it along a direction so as to allow the robot to position the object in the template.

Further features and advantages of the invention are more apparent from the description of a preferred, non-limiting embodiment of the component for feeding robots, automation systems and the like, illustrated by way of example and without limiting the scope of the invention, with the aid of the accompanying drawings, in which:

FIG. 1 shows a perspective view of a variant of the component 1 for feeding a robot, with an enlargement on an end portion of the aligning and diverting means, at the passage of the objects 9 from one to another of the two belts 3 and 4;

Figure 1:
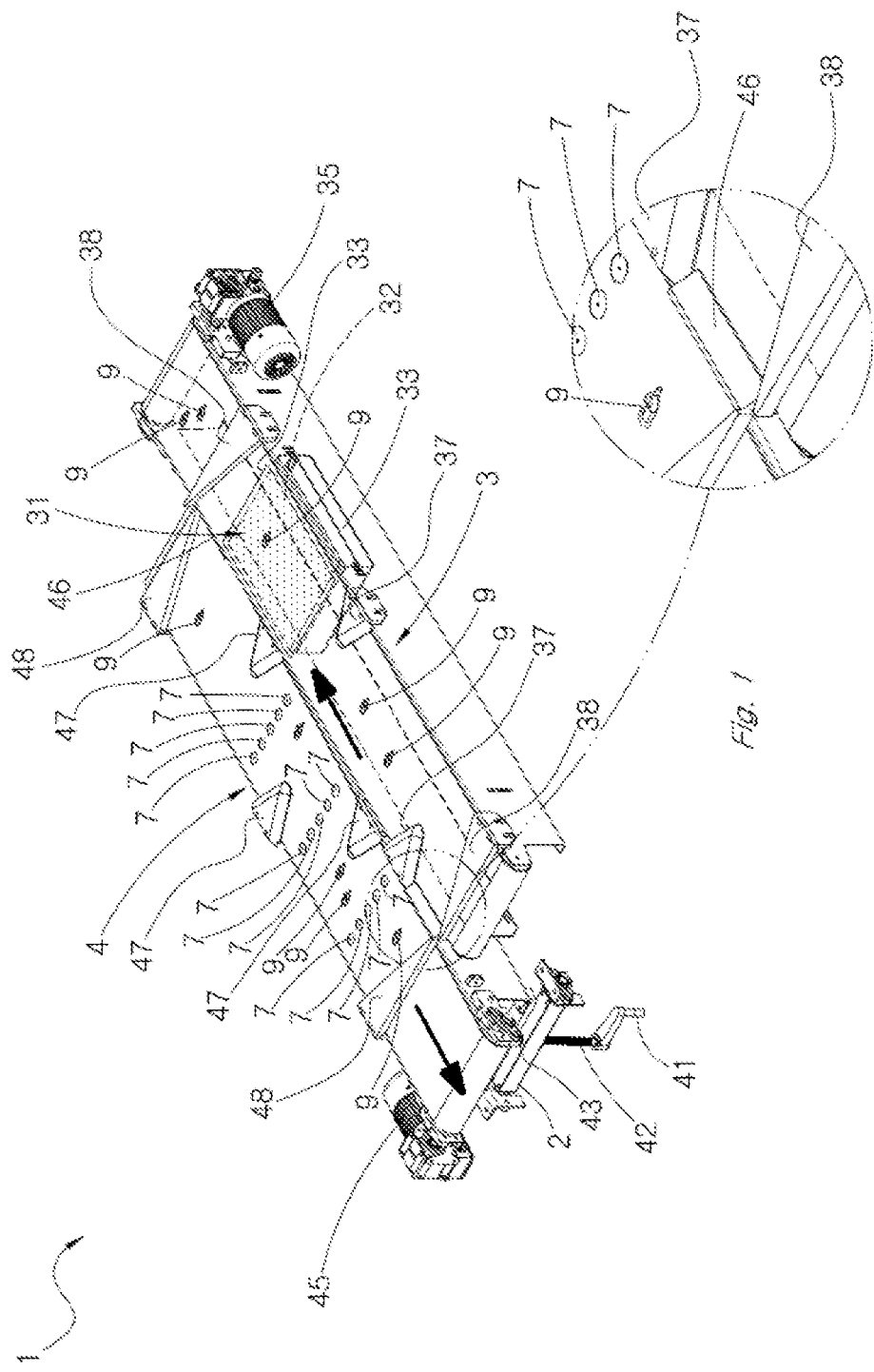

The above-mentioned drawings, show a preferred embodiment of a component for feeding robots, automation systems and the like, according to the invention, which is identified in its entirety with the numeral 1 and which comprises two belts 3 and 4 for conveying objects 9 designed to be gripped by a robot 6. The conveyor belts form a closed path and comprise a first belt 3 and a second belt 4 positioned on a load-bearing frame 2, in such a way that the objects 9 pass from one to the other of the two belts 3 and 4 in a cyclical and continuous fashion.

Normally, the two conveyor belts 3 and 4 are driven, respectively, by two motors 35 and 45.

The first belt 3 and the second belt 4 are positioned in such a way that the first direction of extension 13 of the first belt 3 and the second direction of extension 14 of the second belt 4 are substantially parallel to each other. The belt 3 is integral with the frame 2 and has a supporting surface substantially parallel to the ground.

Figure 2:
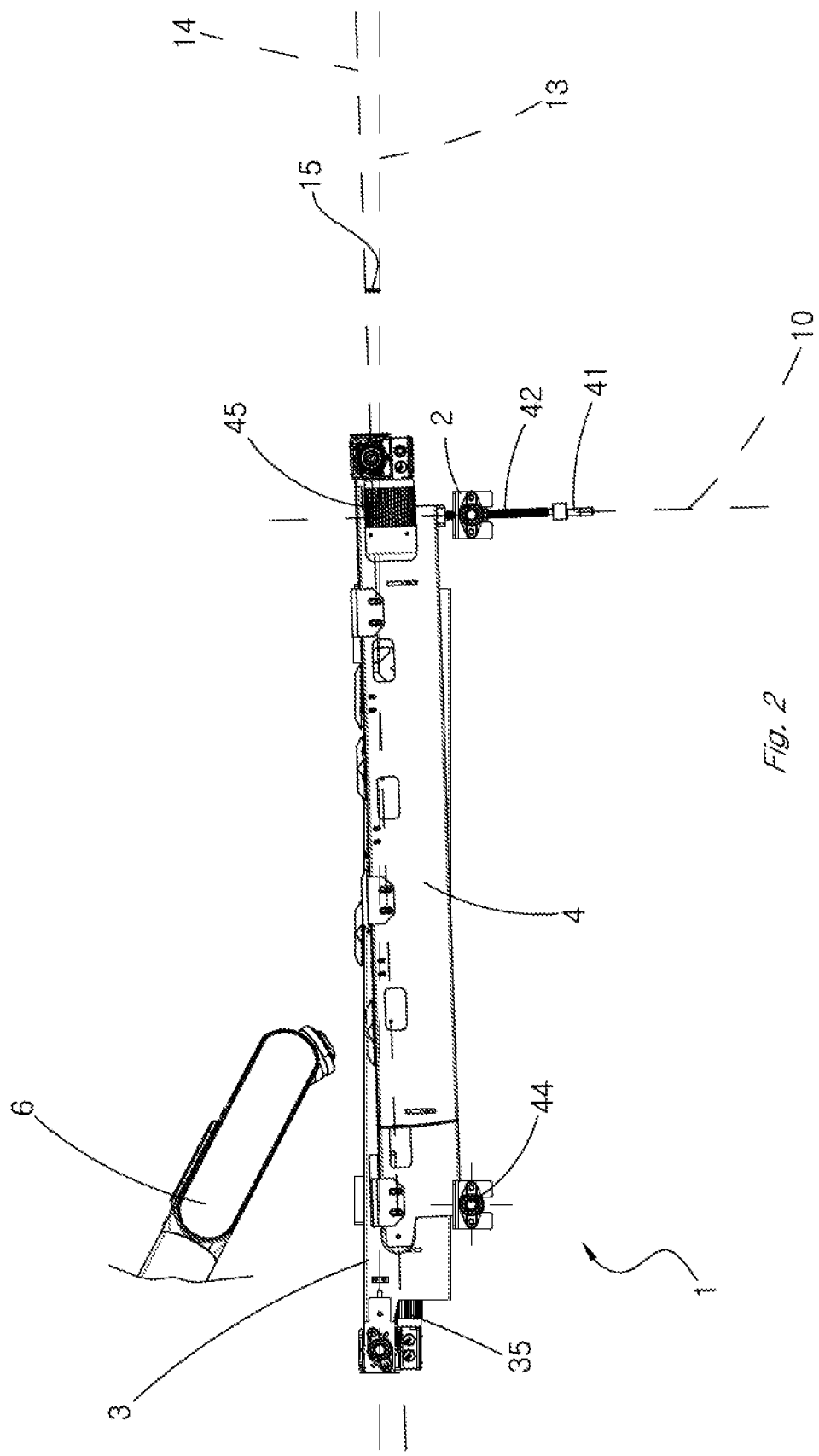
FIG. 2 shows the component 1 of FIG. 1 with the robot 6 to be fed, of which only the raised end part of the arm is shown.

The belt 4, on the other hand, can be oriented by adjusting means which allow the inclination of the belt 4 along an operating direction 10, substantially normal relative to the first direction of extension 13, that is to say, that relative to the "fixed" belt 3 and therefore substantially parallel to the ground. The belt 4 may therefore be oriented between a first position, wherein the second direction of extension 14 is substantially parallel to the ground (and substantially coplanar with the plane defined by the surface of the belt 3), and a second inclined position, wherein the second position of extension 14 is no longer parallel to the ground, but defines an angle 15 with the first direction of extension 13 and therefore with the ground (due to the substantial parallelism between the ground and the direction 13), as shown in FIG. 2.

With reference to FIG. 1, the adjustment means comprise a crank 41 designed to actuate a rod 42 which is interconnected with the second belt 4. The rod 42, which is threaded, is controlled by the rotation of the crank 41 and engages a threaded hole 43 formed in the frame 2. In this way, the crank can move the rod 42 in one direction or the other (towards the belt 3 or in the opposite direction) along the operating direction 10, in such a way that, thanks to the aid of a lead screw (not illustrated) which connects it to a rotation pin 44, the second direction of extension 14 defines the angle 15 in a predetermined manner.

When the operator decides to change the inclination of the belt 4, it is only necessary to rotate the crank 41, clockwise or anticlockwise depending on how the thread of the hole 43 has been made, and change the angle 15.

In the embodiment described here, there are means for separating the objects 9 positioned on the second conveyor belt 4 into at least two different parts.

The separating means comprise three series of pistons 7, of suitable size, which shake the lower surface of the belt 4 from the bottom upwards.

In this example embodiment, the three series of pistons 7 each consist of a succession of five pistons to form a row. The pistons of each row may be actuated individually, in groups or collectively, in such a way that each of them presses alternatingly the lower surface of the second belt 4, moving from the bottom upwards.

These pistons 7, as well as being activated individually or in selected groups, can also preferably be provided with synchronised movements allowing, as well as overturning of the objects 9, which in this way are separated into two groups on different parts of the belt 4, also a further separation.

The shaking movement of the pistons 7 on the belt 4 allows a further overturning but mainly has the function of separating the grouped objects 9.

The synchronisation of their movement is given by the fact that the pistons 7 are powered by a pneumatic solenoid valve and it is therefore possible to manage their operation by activating the pistons 7 as desired: the standard operation comprises moving pairs in an alternating fashion, that is to say, when a first piston rises, the second falls both in direction (along the direction 13 and 14) and transversally (in height).

As shown in FIG. 1, the alignment means comprise traps 37 and 47 formed on the supporting surface of the belts 3 and 4 and also diverters 38 and 48, which are also formed on the supporting surface of the belts 3 and 4 at the end of stroke of the belts.

The traps 37 and 47 are trapezoidal plastic equipment which have the purpose of obstructing and directing the flow of raw goods through the belts 3 and 4; their trapezoidal shape also allows the overturning of the objects 9 in such a way as to increase the probability that the part to be picked up is positioned correctly at the end of the path, when it arrives close to the robot 6. This sort of obstacles are positioned in the peripheral ribs 36 and 46, of sheet metal, of the two belts 3 and 4 and have a variable position along the direction of extension 13 and 14. They are also variable in height, that is, in a direction normal to 13 and 14, modifying the distance between the base of the trap 37 and 47 and the belt 3 and 4.

In the same way, the diverters 38 and 48 are also obstacles made of plastic or similar materials which allow the passage of the pieces from one belt to another. They also have a variable location both in a longitudinal and transversal direction.

In addition to these means for aligning and diverting the objects, there are also two chutes 46 (enlargement of FIG. 1) designed to facilitate the passage of the objects 9 from one belt to another, located close to the step formed by the belts 3 and 4, close to the diverters 38 and 48.

Again with reference to FIG. 1, the backlighting means highlight the edges of the object 9 relative to the belt 3, which is made completely of an optically transparent synthetic material.

In reality, it is not necessary for the belt 3 to be transparent, but it must in any case highlight—by contrast—the geometrical shape of the object 9 on the belt, in such a way that the robot 6 can obtain the spatial orientation of the object 9.

The backlighting device 31, which is merely a LED illuminator (or a similar device) specifically designed for the vision systems of the robot, not illustrated, is positioned below the belt 3, at the vision system of the robot 6, which is of per se known type.

Between the backlighting device 31 and the belt 3, a transparent sheet-like element 32 is interposed, as a filtering means, at the vision systems of the robot, suitably coloured to heighten the chromatic contrast with the object 9.

Since, at the operating portion, the frame of the belt 3 has a window 33 (FIG. 1) to allow the complete passage of the light emitted by the backlighting LED 3, advantageously the element 32 gives the solidity to the belt 3 which would otherwise be missing when the robot picks up the objects deposited on the belt 3.

Obviously, when referring to elements, members, means or parts which are "optically transparent", it is understood that these elements, members, means or parts let the light pass through, or at least a part of it, from one side of the element, member, means or part to the opposite side, net of the frequency absorbed by the element, member, means or part.

Inside the belt 3 there is a drawer container 33 which allows a fast and rapid replacement of the lamp to guarantee optimum maintenance of the backlighting device 31, as well as the insertion of lamps with different features which allow the component 1 to be extremely versatile.

Figure 3:
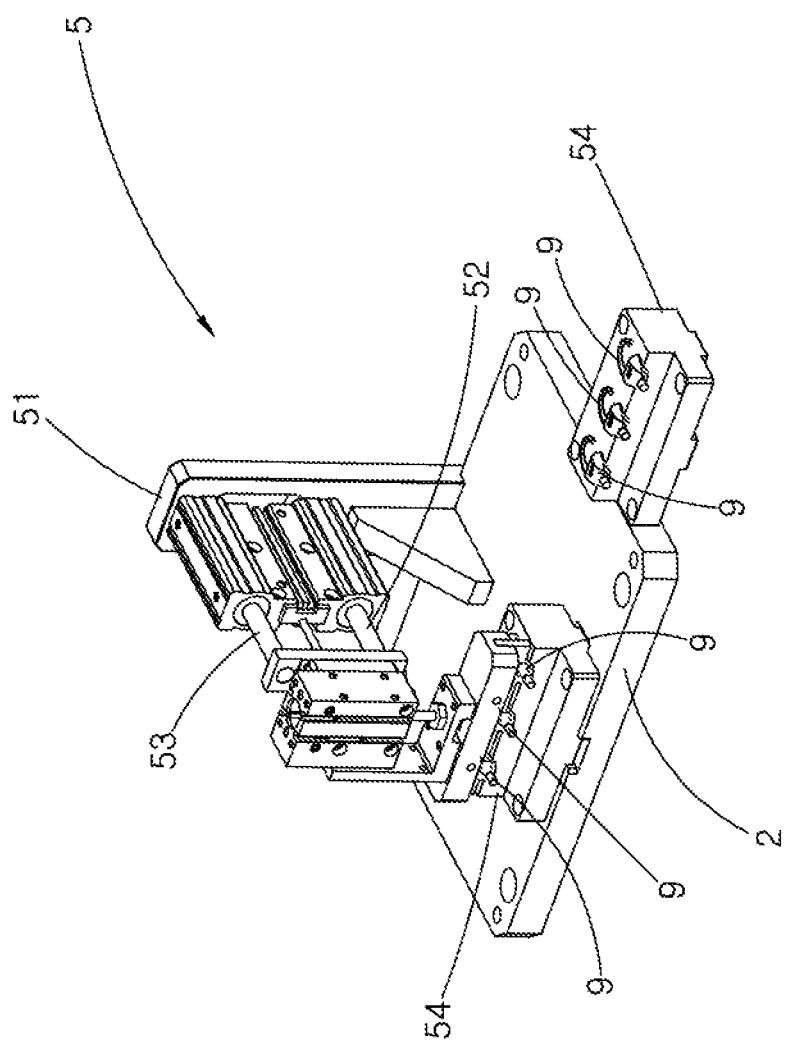
FIG. 3 is a perspective view of the zero-setting system 5.

The zero-setting system 5 of the object 9 which is picked up by the robot 6 beneath the vision system to be located on a suitable template 54, the shape of which is the negative copy of the object 9, has two pistons 52 and 53, located on the frame 51, which activate for a flattening head 51 for the object 9: the positioning piston 52 places the object 9 on the template 54 and the movement piston 53 allows the translation of the positioning piston 52 forwards and backwards, in order to allow the robot 6 to be positioned in the template 54 of the object 9 (FIG. 3).

In practice, the objects 9 which arrive from the hoppers (not illustrated) upstream of the component 1 according to the invention move along the belts 3 and 4, powered by the motors 35 and 45, following a closed loop circuit, jumping from one belt to another thanks to the diverters 38 and 48, in such a way as to cyclically pass below the vision systems of the robot 6 which picks them up and positions them in the special template 54 of the zero-setting system 5.

During the path, the objects 9 are singled out by means of the vibrations imparted by the pistons 7 which allow the objects, with their striking on the belt 4, to be positioned in two separate parts of the belt 4, whilst the traps 37 and 47 align them in the central portion of the belt 3, which leads to the vision systems.

The suitable inclination of the belt 3 favours the overturning of the objects, facilitating the gripping of the robot 6.

Once the object 9 passes from the backlighting device 31, the robot 6, thanks to the improved recognition of the geometrical shape of the object 9, is able to pick it up with precision and safety, moving it to the zero-setting system 5 where it is positioned on the template 54 by the movement piston 53 which guides the positioning piston 52 and then pressed by the latter. From the above description, it can be seen how the invention achieves the preset purpose and aims and in particular the fact that a component is made for feeding robots, automation systems and the like, which is compact and suitable for objects of any size, thanks to the closed loop arrangement of the belts it consists of.

In effect, by allowing the possibility of adjusting the inclination of one or more of the conveyor belts, a suitable counter-slope is formed for overturning even larger objects.

Moreover, with the vibration imparted by the pistons, together with the adjustment of the inclination of the sliding plane of the belt, there is a misalignment of the planes of the two belts (in particular, the use of the pistons increases the probability that the objects are overturned on themselves) allowing the rubbing of small groups of objects which arrive at the belts from the hoppers and therefore allow objects of any size and shapes to be recognised and picked up by the robot without problems. Another advantage of the invention is due to the fact that the contrast created by the backlighting device allows the robot to very precisely read the geometry of the object to be picked up, allowing the robot to obtain its spatial orientation and therefore making possible an effective gripping and having high accuracy gripping coordinates.

Lastly, the use of shared means and materials makes the device economically competitive.

It will be understood that the invention can be modified and adapted in several ways without thereby departing from the scope of the inventive concept.

Moreover, all the details of the invention may be replaced by technically equivalent elements.

In practice, all the materials used, as well as the dimensions, may vary according to requirements, providing they are consistent with the aim of the invention.

The invention claimed is:

1. A component (1) for powering robots, comprising, on a frame (2):
    a series of belts (3, 4) for conveying objects (9) designed to be gripped by a robot (6);
    said conveyor belts (3, 4) constitute a closed path; and having a first belt (3) and at least a second belt (4) positioned and configured so that the objects (9) pass from said first belt (3) to the at least one second belt (4) cyclically and continuously;
    wherein at least one (4) of said at least two conveyor belts (3, 4) is arranged, by adjusting means (41, 42), along an operating direction (10) substantially normal relative to the first direction of extension (13), between a first position wherein the relative direction of extension (14) is substantially parallel to the ground and a second inclined position, wherein the relative position of extension (14) defines an angle (15) with the ground.

2. The component according to claim 1, wherein said first belt (3) and the at least one second belt (4) are positioned and configured so that their respective directions of extension (13, 14), a first direction of extension (13) relative to the first belt (3) and a second direction of extension (14) relative to the at least a second belt (4), are substantially parallel to each other.

3. The component according to claim 1, wherein the adjustment means (41, 42, 43) comprise a crank (41) designed to actuate a rod (42) which is interconnected with said second belt (4) and which engages with said frame (2), configured so that the second direction of extension (14) defines said angle (15) in a predetermined manner.

4. The component according to claim 1, comprising means (7) for separating the objects (9) positioned on at least one conveyor belt (3, 4) of said at least two conveyor belts (3, 4) into at least two separate parts of said conveyor belt (3, 4).

5. The component according to claim 4, wherein the separating means (7) comprise at least one series of pistons (7) which can be operated are operable individually or collectively, configured so that each piston of said series of pistons (7) is designed to press alternately the lower surface of said at least one belt (4) moving from the bottom upwards.

6. The component according to claim 1, comprising means (37, 38, 47, 48) for aligning and/or diverting the objects (9) positioned on at least one conveyor belt (3, 4) of said series of conveyor belts (3, 4).

7. The component according to claim 6, wherein said aligning and/or diverting means (37, 38, 47, 48) comprise traps (37, 47) defined on the supporting surface of said at least one conveyor belt (3, 4) and/or diverter (38, 48).

8. The component according to claim 1, comprising means (31, 32) for backlighting the object (9) to be picked relative to at least one portion of action of said conveyor belts (3, 4), configured so that the chromatic contrast between the object (9) and said portion of action clearly highlights the edges of the object (9).

9. The component according to claim 8, wherein the backlighting means (31, 32) comprise a backlighting device (31) positioned below said portion of action and filtering means, made of optically transparent material, (32) integral with said frame (2) and interposed between said portion of action and said backlighting device (31), configured so that the light coming from said backlighting device (31), and filtered by said filtering means (32), is of chromatic contrast for the viewing systems of the robot.

* * * * *

UNITED STATES PATENT AND TRADEMARK OFFICE
CERTIFICATE OF CORRECTION

PATENT NO. : 11,261,035 B2
APPLICATION NO. : 16/591028
DATED : March 1, 2022
INVENTOR(S) : Serena Magni et al.

It is certified that error appears in the above-identified patent and that said Letters Patent is hereby corrected as shown below:

In the Claims

Column 8, Line 24 (Claim 5, Line 3), after "which" delete "can be operated".

Signed and Sealed this
Sixteenth Day of August, 2022

Katherine Kelly Vidal
*Director of the United States Patent and Trademark Office*